United States Patent

(11) 3,592,169

| [72] | Inventor | Thomas D. Killmon<br>Rte. 1, Council Bluffs, Iowa 51501 |
|---|---|---|
| [21] | Appl. No. | 857,893 |
| [22] | Filed | Sept. 15, 1969 |
| [45] | Patented | July 13, 1971 |

[54] SELF-CLEANING BIRDHOUSE
4 Claims, 4 Drawing Figs.

| [52] | U.S. Cl. | 119/23 |
|---|---|---|
| [51] | Int. Cl. | A01k 31/00 |
| [50] | Field of Search | 119/23, 45, 22 |

[56] References Cited
UNITED STATES PATENTS

| 1,628,597 | 5/1927 | Tisch | 119/23 |
| 1,634,209 | 6/1927 | Reiber | 119/23 |
| 2,876,738 | 3/1959 | Wettendorf | 119/23 |
| 3,111,934 | 11/1963 | Vail | 119/23 |
| 3,164,129 | 1/1965 | Rigterink | 119/45 |

Primary Examiner—Aldrich F. Medbery
Attorney—Hiram A. Sturges

ABSTRACT: A birdhouse having a roof and a floor and having a nesting area, front wall and rear wall, which are connected together so that they can be moved outwardly beyond the floor to allow old nesting material to fall down from the birdhouse, and means for moving the front and rearward walls inwardly and outwardly as controllable from the ground.

PATENTED JUL 13 1971 3,592,169
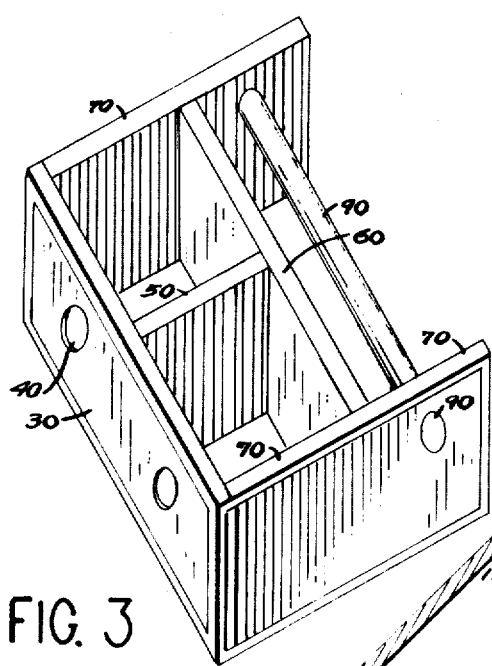
FIG. 3
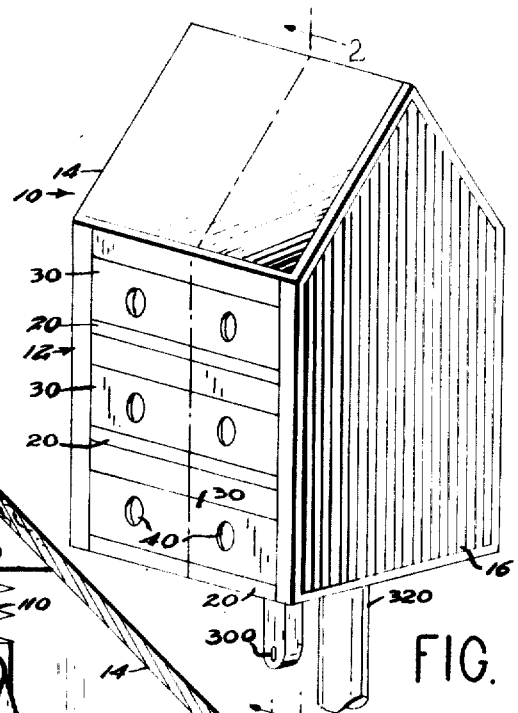
FIG. 1
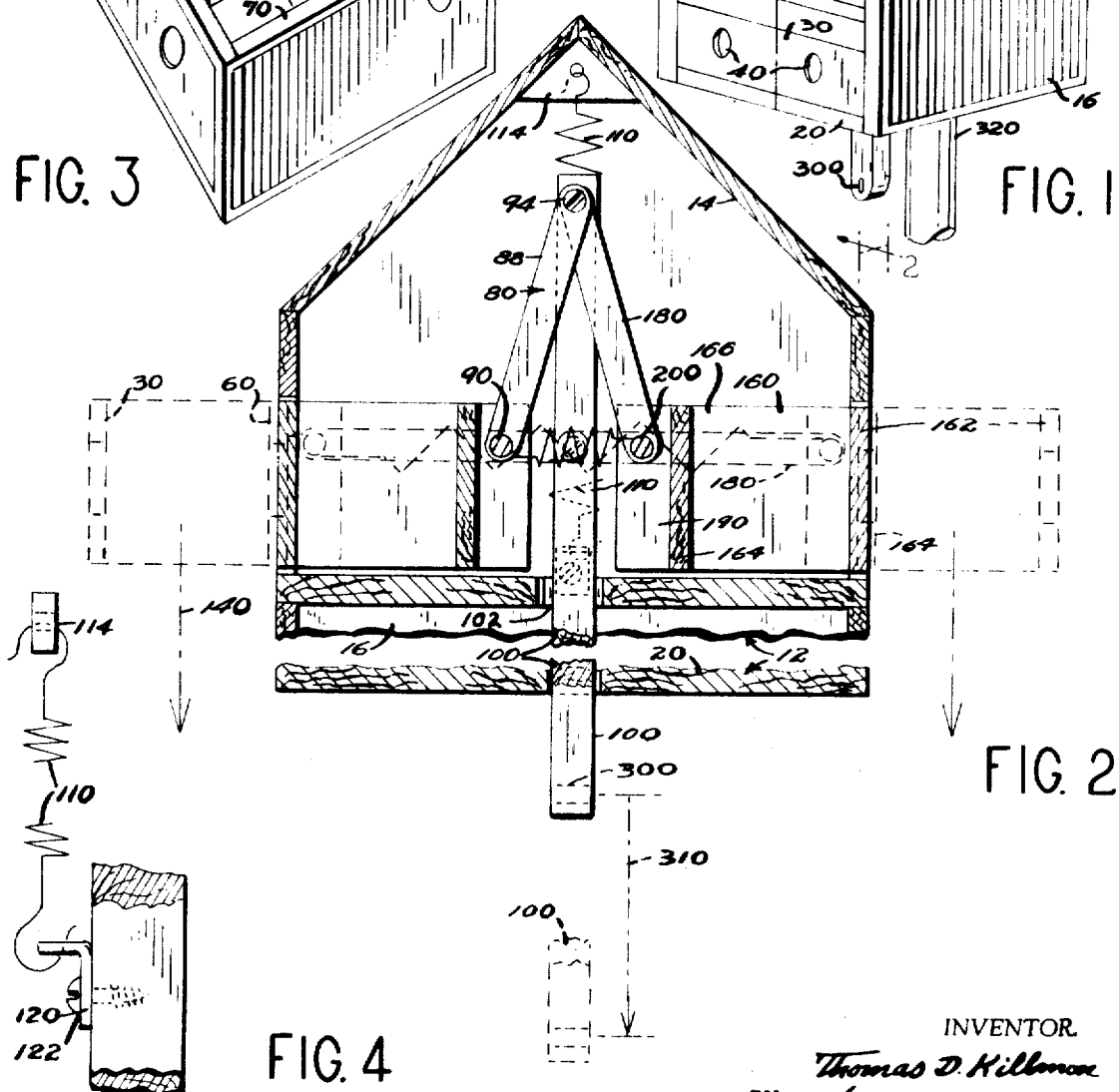
FIG. 2
FIG. 4
INVENTOR.
Thomas D. Killman
BY Hiram A. Sturges
Agent

3,592,169

SELF-CLEANING BIRDHOUSE

FIELD OF THE INVENTION

This invention is in the field of birdhouses.

DESCRIPTION OF THE PRIOR ART

Owners of birdhouses have had a considerable problem in that birdhouses are relatively hard to reach, being mounted on a pole, and yet it is necessary to take them down to clean out old nesting material so that new nests can be built in clean areas for the next season.

The labor of taking care of birdhouses in this manner has caused many people either not to put up birdhouses, or to allow them to go untended and unused.

No adequate solution to this problem has been found in the prior art.

SUMMARY OF THE INVENTION

A birdhouse having a roof and a floor and having a nesting area, front wall and rear wall, which are connected together so that they can be moved outwardly beyond the floor to allow old nesting material to fall down from the birdhouse, and means for moving the front and rearward walls inwardly and outwardly as controllable from the ground.

The birdhouse described in combination with releasable retaining means attached to the rearward side of the rearward wall and preventing the rearward wall from falling over the forward edge of the floor means, the retaining means comprising a linkage disposed rearwardly of the rearward wall, means connecting the linkage to the rearward wall so that the linkage extends rearwardly from and vertically from the rearward wall, means attached to the linkage for moving the inner end of the linkage vertically toward the rearward wall to cause the rearward wall to forwardly push the bird nesting materials over the forward edge of the floor.

The inner end of the linkage being pivotally connected to a vertically sliding control member which is mounted in the housing of the birdhouse and which is held in an upper position by spring means, whereby the control member can be pulled vertically downward against the operation of the spring means for causing the linkage to move downward at its rearward end to urge the forward and rearward walls into an outer position for dumping old nesting materials.

The combination described in which other and similar rear and front wall means are provided on an opposite side of the control member and are connected by separate linkage pivotally to the control means for simultaneously moving the other front and rear wall means outwardly of an opposite side side of the birdhouse for simultaneously dumping nesting materials out of both sides of the birdhouse.

BRIEF DESCRIPTION OF THE DRAWING

FIG. 1 is a perspective view of the birdhouse constructed in accordance with this invention shown mounted on a post, the lower portion of which is broken away.

FIG. 2 is a sectional view of the birdhouse taken along the line 2-2 of FIG. 1.

FIG. 3 is a perspective view showing the moving wall assembly which surrounds a pair of nests on one side of the birdhouse.

FIG. 4 is a detail showing upper and lower portions of a spring as attached to a vertically sliding control member, portions of the control member and of the spring being broken away for convenience of illustration.

DESCRIPTION OF THE PREFERRED EMBODIMENT

The birdhouse of this invention is generally indicated at 10 and has an outer housing generally indicated at 12, which latter has a roof 14, sidewalls 16 on right and left sides and further has a plurality of floors 20 disposed spaced one above the other for the reception therebetween of nesting area front walls 30 having entrance openings for birds to pass therethrough as shown at 40.

The entrance openings can be one or more per each front wall 30 and, in the example shown, two openings 40 are shown for a single front wall with the area to the rearward of the front wall 30 being divided by a nest divider wall 50, which latter connects to a nesting area rear wall 60 which is parallel to a respective forward wall 30 and attached thereto by the connector or divider wall 50 and by nesting area sides 70.

A retaining assembly is generally indicated at 80 in FIG. 2 comprising a linkage 88 pivotally connected to a rod 90 which is itself connected by inwardly or rearwardly extending ends of the walls 70 to the remainder of the walls 70 and thereby to the forward and rearward walls 30 and 60 of the nesting area. The linkage 88 extends upwardly and rearwardly above the front wall 30 and is pivotally attached by suitable securing member 94 to a vertically sliding control member 100, which latter extends slidably through an opening 102 down through the lowermost one of the floors 20 and thereby outwardly of the outer housing 12.

The control member is urged toward an upward position by a tension spring 110 which has its upper end connected to a brace 114 fixed to the roof 14 and which has its lower end connected by a bracket 120 and screw 122 to a side of the control member 100. The securing member 94 and the rod 90 are on parallel horizontal axes so that when the control member 100 moves downwardly, the linkage 88 is caused to move forwardly at its lower end for urging the forward and rearward walls 30 and 60 outwardly into the dotted line positions shown in FIG. 2 for causing nesting materials disposed therebetween to fall out and downwardly alongside the birdhouse in the direction of the arrow 140.

On the other, or rearward side 150 of the birdhouse are nesting areas 160 having sliding outer and inner walls 162 and 164, which latter are connected by a connecting wall 166 whereby the walls 162 and 164 and 166 bear a similar relationship with respect to each other to the walls 30, 60 and 50 of FIG. 3 so that the walls 162, 164 and 166 form a nesting area boundary wall assembly which can be moved outwardly across a respective floor 20 by means of a linkage 180 similar to the linkage 88 and connected to end walls 190 of the rearward nesting boundary wall assembly 194 by a further rod.

A plurality of rearward linkages 180 can be employed so the assemblies can be stacked, one for each nesting boundary wall assembly and their inner and upper ends can be pivotally attached to the control member 100 by a securing means or screw similar to 94 that attaches the linkage 88 to the control member 100.

As thus described, when the control member 100 is pulled downwardly, the nesting area boundary wall assemblies on the rearward side of the birdhouse dump their old nesting materials at the same time as the nesting area boundary wall assembly on the forward side of the birdhouse and formed by the forward wall 30 and the rearward wall 60 and the walls 50 and 70.

The number of such forward and rearward nesting area boundary wall assemblies is optional and three forward stacked assemblies are shown in FIG. 1, all of which could dump at the same time by having other linkages connected thereto and connected also to the same control rod 100.

The lower end of the control rod 100 can have an opening 300 therethrough which can be reached by an operator using a pole with a small hook on it for pulling the control member 100 downwardly, although a rope could also be attached to the opening 300 although a rope would be in greater danger of being pulled by mischievous children.

In FIG. 2, at the lower portion, a downward position of the lower end of the control member 100 is shown in dotted line with the downward motion thereof indicated by an arrow 310.

I claim:

1. A birdhouse comprising: a sliding frame including sidewalls and a front wall frame portion and defining an open bottom, at least one floor means attached to said frame, front wall means, a rear wall means spaced inwardly of said housing from said front wall means and disposed above said floor means defining a nesting area assembly means, said front wall means and said rear wall means both being movable forwardly and rearwardly across said floor means, means connecting said front walls means and said rear wall means and beyond said front frame portion whereby said front wall means and said rear wall means both move forwardly or rearwardly together with respect to said floor means to release and dump the contents of the nesting area outwardly of the frame.

2. The combination of claim 1 further comprising said front and rear wall means and said connecting means defining an assembly, releasable retaining means attached to said assembly and preventing said rearward wall from falling over the forward edge of said floor means at a time when the forward side of said rearward wall is at the edge of said floor means.

3. The combination of claim 2 in which said retaining means comprises an elongated linkage normally inclining upwardly towards its inner end, the outer end of said linkage being pivotally attached to said assembly, a vertically sliding control member normally having a lower end projecting through the lower end of said frame, the inner end of said linkage being attached to said control member pivotally for pivoting about a horizontal axis, spring means attached to said frame and to said control member and normally urging said control member upwardly, and downward movement of said control member causing forward movement of said linkage as pushes forward the said assembly.

4. The combination of claim 3 in which the lower end of said control member has means thereon having an upper surface which is adapted to be engaged for urging downwardly on said upper surface to move said control member downwardly.